US010112655B2

(12) United States Patent
Freeman et al.

(10) Patent No.: US 10,112,655 B2
(45) Date of Patent: Oct. 30, 2018

(54) STRUCTURAL REINFORCEMENT FOR VEHICLE UPPER REAR CORNER PANEL

(71) Applicant: Ford Global Technologies, LLC, Dearborn, MI (US)

(72) Inventors: Michael James Freeman, Allen Park, MI (US); Mohammed F. Ahmed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 14/995,451

(22) Filed: Jan. 14, 2016

(65) Prior Publication Data
US 2017/0203795 A1 Jul. 20, 2017

(51) Int. Cl.
*B62D 27/02* (2006.01)
*B62D 25/04* (2006.01)
*B62D 25/06* (2006.01)

(52) U.S. Cl.
CPC .......... *B62D 27/02* (2013.01); *B62D 25/04* (2013.01); *B62D 25/06* (2013.01); *B62D 27/023* (2013.01)

(58) Field of Classification Search
CPC ...... B62D 27/023; B62D 27/02; B62D 25/06; B62D 25/04
USPC ................ 296/210, 193.06, 30, 202, 203.04
See application file for complete search history.

(56) References Cited

U.S. PATENT DOCUMENTS

| 4,775,181 | A | * | 10/1988 | Shoda | B62D 25/06 |
| | | | | | 296/202 |
| 6,126,232 | A | | 10/2000 | Nakano | |
| 6,254,174 | B1 | * | 7/2001 | Wee | B62D 25/04 |
| | | | | | 296/193.06 |
| 6,293,617 | B1 | | 9/2001 | Sukegawa | |
| 7,306,279 | B2 | | 12/2007 | Saitoh | |
| 8,011,719 | B2 | | 9/2011 | Walter et al. | |
| 8,029,047 | B2 | | 10/2011 | Kim et al. | |
| 2009/0026793 | A1 | | 1/2009 | Ichinose et al. | |
| 2010/0127532 | A1 | | 5/2010 | Hosaka et al. | |
| 2012/0256445 | A1 | | 10/2012 | Baccouche et al. | |
| 2013/0320716 | A1 | | 12/2013 | Nishimura et al. | |
| 2016/0107702 | A1 | * | 4/2016 | Stein | B62D 21/09 |
| | | | | | 280/781 |

FOREIGN PATENT DOCUMENTS

WO 2014181739 A1 11/2014

* cited by examiner

*Primary Examiner* — Joseph D. Pape
(74) *Attorney, Agent, or Firm* — Jason Rogers; Brooks Kushman P.C.

(57) ABSTRACT

A structural reinforcement assembly for a vehicle body structure is provided. The assembly may include a pillar portion, a roof cross member, and a bead formation. The pillar portion may disposed at a rear upper corner region of the body structure and between a rear quarter window opening and a liftgate opening defined by the body structure. The roof cross member may extend along an upper portion of the liftgate opening. The bead formation may extend from the pillar portion to the roof cross member to reinforce the rear upper corner region. The bead formation may define an arc shape having a first end located adjacent the roof cross member and an access hole.

13 Claims, 5 Drawing Sheets

STRUCTURAL REINFORCEMENT FOR VEHICLE UPPER REAR CORNER PANEL

TECHNICAL FIELD

The present disclosure relates to structural reinforcements for vehicle upper rear corner regions.

BACKGROUND

Examples of vehicles with rear liftgates may include a sport utility vehicle ("SUV"), crossover utility vehicle ("CUV"), a five-door vehicle, or a station wagon vehicle. Each of these vehicles includes a passenger cabin area that transitions to a rear cargo area or hatch area. The liftgate is typically proximate the rear cargo area or hatch area and opens thereto. A body structure of each vehicle defines a liftgate opening to receive the liftgate.

SUMMARY

A structural reinforcement assembly for a vehicle body structure includes a pillar portion, a roof cross member, and a bead formation. The pillar portion is disposed at a rear upper corner region of the body structure and between a rear quarter window opening and a liftgate opening defined by the body structure. The roof cross member extends along an upper portion of the liftgate opening. The bead formation extends from the pillar portion to the roof cross member to reinforce the rear upper corner region. The bead formation may define an arc shape having a first end located adjacent the roof cross member and an access hole. The bead formation may further define a second end. The liftgate opening may define an edge having first and second locations at portions of the edge that transition from a curve to substantially straight edges. A first axis may be defined by the first end and first location and a second axis may defined by the second end and second location. An angle between the first and second axis may be between a range of twenty nine degrees and one hundred and fifty one degrees. The body structure may further define a weld access hole adjacent an inner arc portion of the bead formation. The bead formation and the body structure may define a cavity sized to receive a wire bundle. A cover plate may be mounted to the body structure such that the bead formation is contained therein. The bead formation may be located adjacent a weather strip flange defining a first arc substantially congruent to a second arc defined by the bead formation.

An upper body structure for a vehicle having a liftgate includes a pillar portion, a roof cross member, a bead formation, and a cover plate. The roof cross member transitions to the pillar portion. The bead formation arcuately extends from the pillar portion to the roof cross member to structurally reinforce a rear upper corner region of the upper body structure. The cover plate is mounted to the upper body structure such that the bead formation is disposed therebetween. The upper body structure may define a curved corner portion at a liftgate opening adjacent the bead formation. The curved corner portion may be disposed between first and second infinite radii support members of the liftgate opening. The bead formation may define a substantially equal cross-section along a length of the bead formation between a first end and a second end. A wire bundle may be disposed between the bead formation and a first end of an air bag curtain. The bead formation may define an arc shape substantially congruent to an arc defined by an adjacent liftgate opening of the upper body structure. The bead formation may define a substantially tubular shape. The bead formation may define cross-sections at a first and second end which are each larger than a cross-section of a central portion of the bead formation.

An upper body structure for a vehicle includes a pillar portion, a roof cross member, and a bead formation. The pillar portion is disposed between one of two door openings or two window openings defined by the upper body structure. The roof cross member extends along an upper portion of the door openings. The bead formation arcuately extends from the pillar portion to the roof cross member to structurally reinforce the upper body structure at the pillar portion. One of the two window openings may be a rear quarter window opening. The bead formation may define a first end sized for location between an access hole and a rear quarter window opening. The bead formation may define a substantially tubular shape. The bead formation may be adjacent a wire bundle, an interior trim panel housing an air bag curtain, and at least one weld access hole. The pillar portion may be one of a vehicle a-pillar, b-pillar, c-pillar, or d-pillar.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
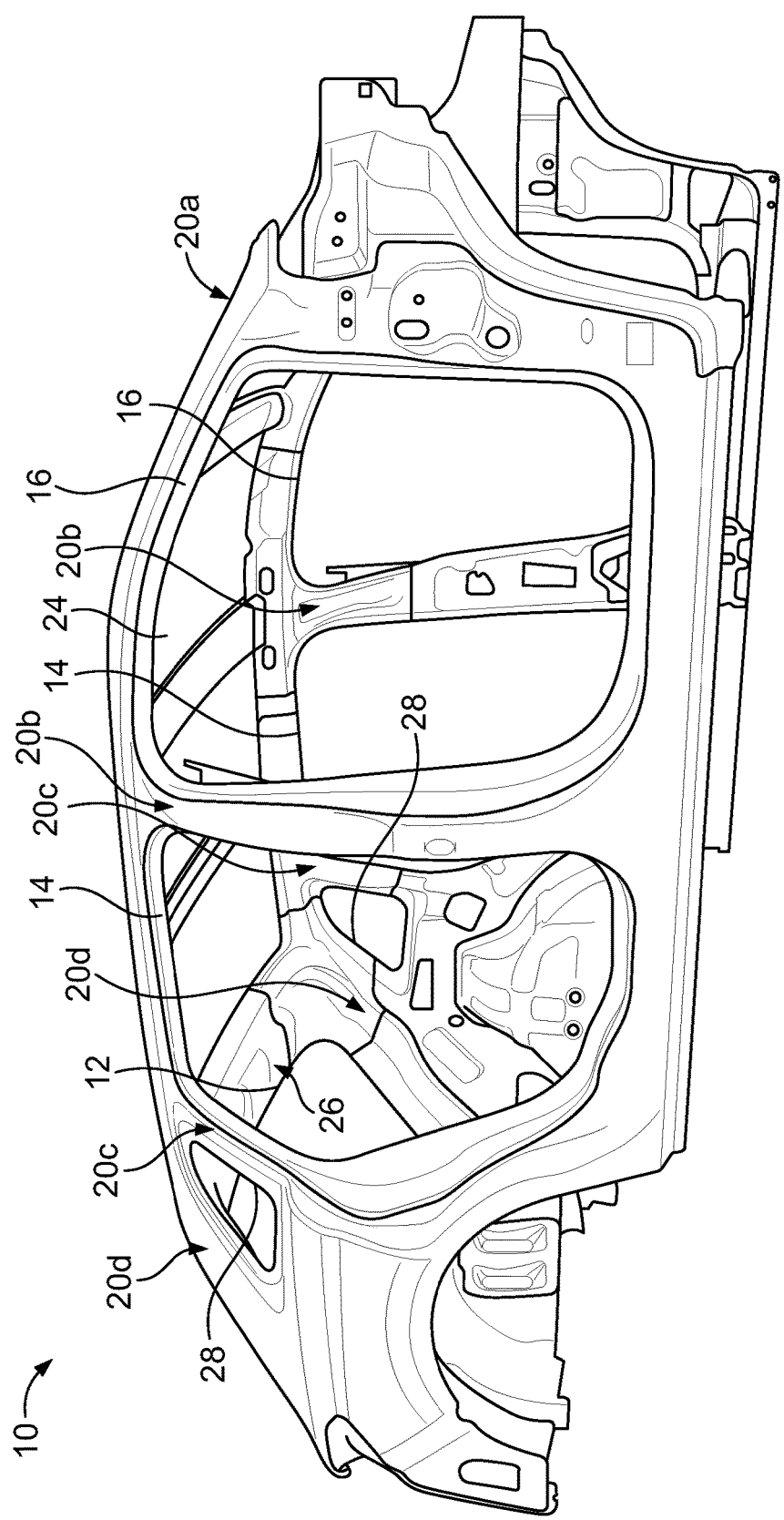
FIG. 1 is a perspective view of a portion of a vehicle body structure.

FIG. 1 shows an example of a portion of a vehicle body structure, referred to generally as a vehicle body structure 10 herein. The vehicle body structure 10 may be, for example, a body in white structure for a SUV, CUV, or other vehicle having a liftgate. The vehicle body structure 10 defines a liftgate opening 12, a pair of rear door openings 14, and a pair of front door openings 16. The openings may each be sized to receive a suitable liftgate, rear door, and front door, respectively. The vehicle body structure may further define an A-pillar region 20a, a B-pillar region 20b, a C-pillar region 20c, and a D-pillar region 20d. The illustrated vehicle body structure 10 is intended for four doors and a liftgate; however it is contemplated that other configurations of doors and a liftgate may be adopted to incorporate the disclosed concepts. Alternate configurations may include different pillar region references than the vehicle body structure 10. The vehicle body structure 10 may also define a roof 24, a rear header region 26, and a rear quarter window opening 28. The rear header region 26 may extend along an upper portion of the liftgate opening 12 and may sometimes be referred to as a roof cross member. The D-pillar region 20*d* may extend between the liftgate opening 12 and the rear quarter window opening 28.

Figures 2A, 2B:
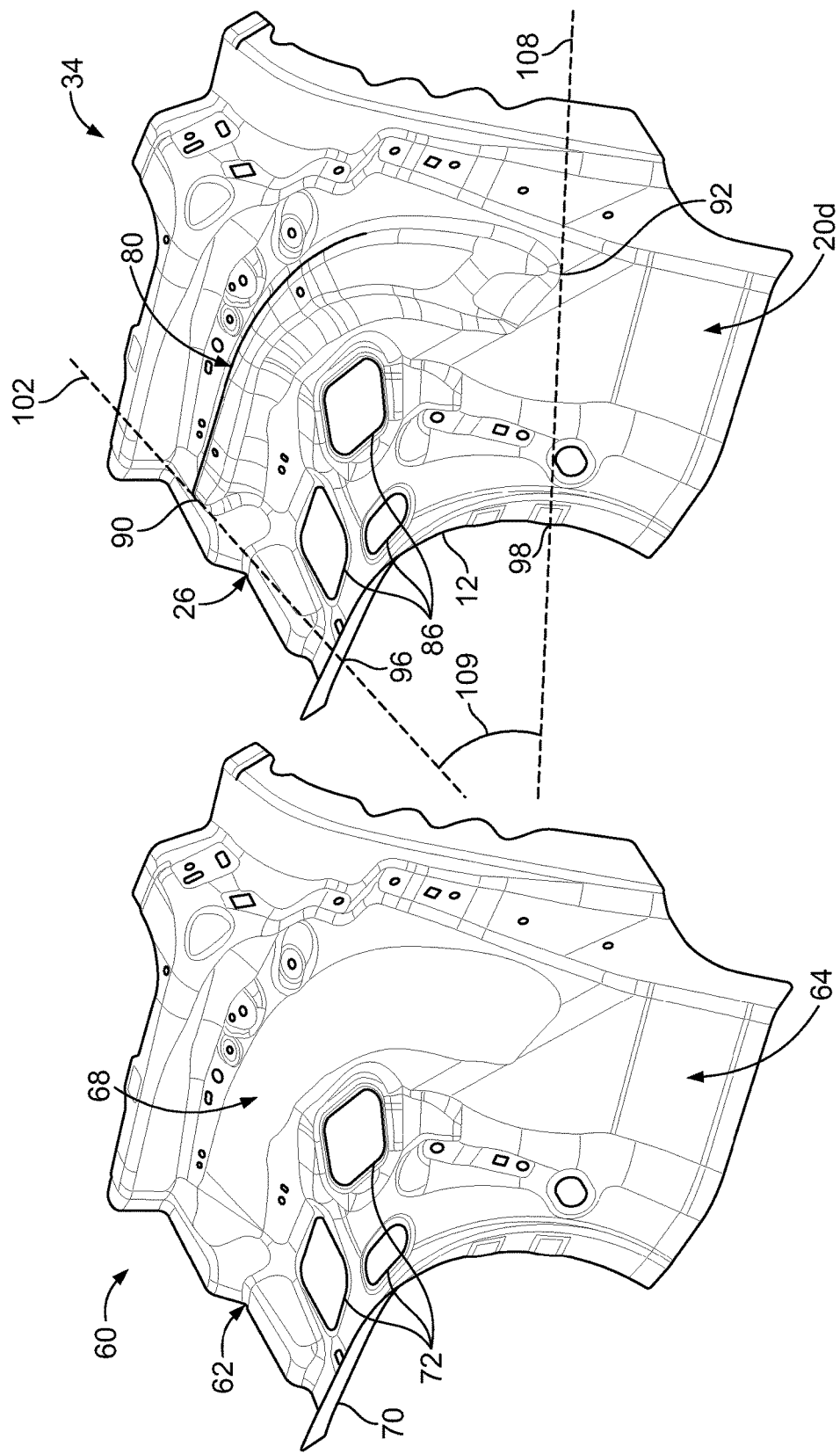
FIG. 2A is a detailed perspective view of an example of an upper inner corner panel region of a vehicle body.
FIG. 2B is a detailed perspective view of an example of an upper corner panel region of a vehicle body.

FIGS. 2A and 2B show two detailed views of examples of rear upper corner regions of vehicle body structures. FIG. 2A shows an example a rear upper corner region without a structural reinforcement bead and FIG. 2B shows a rear upper corner region 34 of the D-pillar region 20*d* in which a structural reinforcement bead is included. The rear upper corner region in FIG. 2A may be referred to generally as a rear upper corner region 60 herein. The rear upper corner region 60 may define a rear header region 62 (shown partially in FIG. 2) and a pillar region 64. The rear upper corner region 60 may define a liftgate opening 70 (shown partially in FIG. 2) and access holes 72 adjacent thereto. The access holes 72 may provide, for example, weld gun access or may provide openings for wires to extend therethrough. The liftgate opening 70 and the access holes 72 may reduce a structural integrity of the rear upper corner region 60.

In contrast to the rear upper corner region 60 in FIG. 2A, a structural reinforcement bead 80 is included in the rear upper corner region 34 of the vehicle body structure 10 shown in FIG. 2B. The rear upper corner region 34 may define access holes 86. The access holes 86 may provide, for example, weld gun access or may provide openings for wires to extend therethrough. The structural reinforcement bead 80 is located proximate the liftgate opening 12 and the access holes 86 to assist in structurally reinforcing the rear upper corner region 34. The structural reinforcement bead 80 may extend from the from the D-pillar region 20*d* to the rear header region 26. The structural reinforcement bead 80 may define a substantially arcuate shape having a first end 90 and a second end 92. In one example, the arcuate shape of the structural reinforcement bead 80 may be substantially congruent to a shape of a curved corner region of the liftgate opening 12. The structural reinforcement bead 80 may define cross-sections at the first end 90 and the second end 92 which are each larger than a cross-section of a central portion of the structural reinforcement bead 80. The first end 90 and the second end 92 may be arranged with an arc of the liftgate opening 12 to assist in providing structural reinforcement to the rear upper corner region 34.

For example, the arc of the liftgate opening 12 may transition to define a substantially straight edge at a first location 96 and a second location 98. The first location 96 and the second location 98 may each be a portion of an infinite radii of support members. An axis 102 may be defined by the first end 90 and the first location 96. An axis 108 may be defined by the second end 92 and the second location 98. An angle 109 between the axis 102 and the axis 108 may less than ninety degrees. A degree of this angle 109 may influence a structural rigidity of the rear upper corner region 34. For example, a structural rigidity of the rear upper corner region 34 may vary with different degrees of the angle 109. In one example, the degree of angle 109 may be between twenty nine degrees and one hundred and fifty one degrees. The structural reinforcement bead 80 may assist in promoting torsional stiffness, in reducing diagonal distortion, and improving noise, vibration, and harshness characteristics for the rear upper corner region 34.

Figure 3:
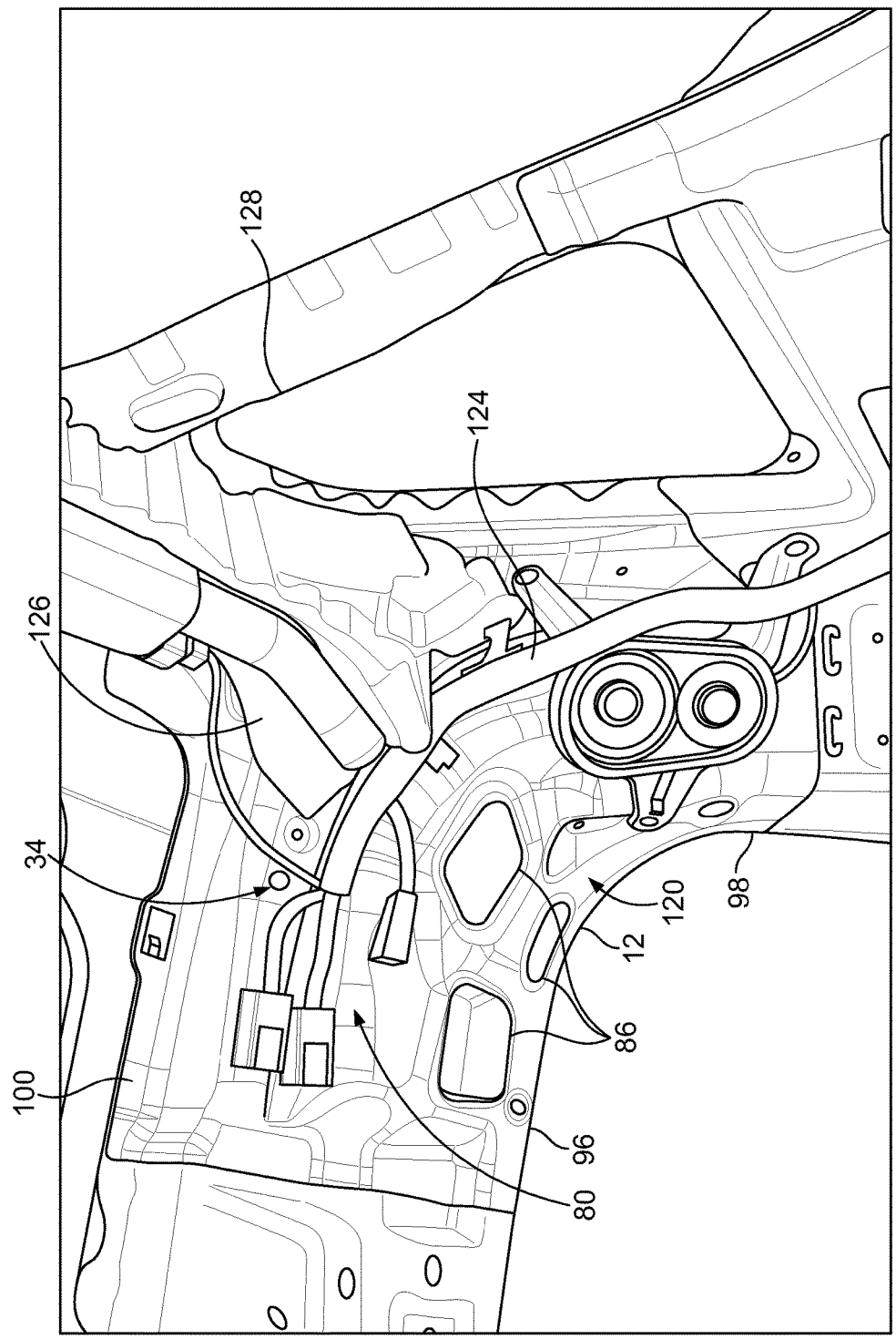
FIG. 3 is a detailed perspective view of an example of an upper inner corner panel region of the portion of the vehicle body structure of FIG. 1.

FIG. 3 shows the rear upper corner region 34 of the vehicle body structure 10 along with additional vehicle components. For example, the structural reinforcement bead 80 may be located adjacent a weather strip flange 120 defining a flange arc being substantially congruent to an arc defined by the structural reinforcement bead 80. The structural reinforcement bead 80 may be sized such that wires or other vehicle components may be contained therein or to define a valley for a wire bundle, such as a wire bundle 124, to be disposed therein. A cover plate (not shown in FIG. 3) may be mounted to the rear upper corner region 34 such that the structural reinforcement bead 80 is contained between the cover plate and the vehicle body structure 10. The cover plate may provide further structural reinforcing characteristics to the rear upper corner region 34. The structural reinforcement bead 80 may be located adjacent an air bag curtain 126 and may have various shapes according to structural reinforcement needs.

Figure 4:
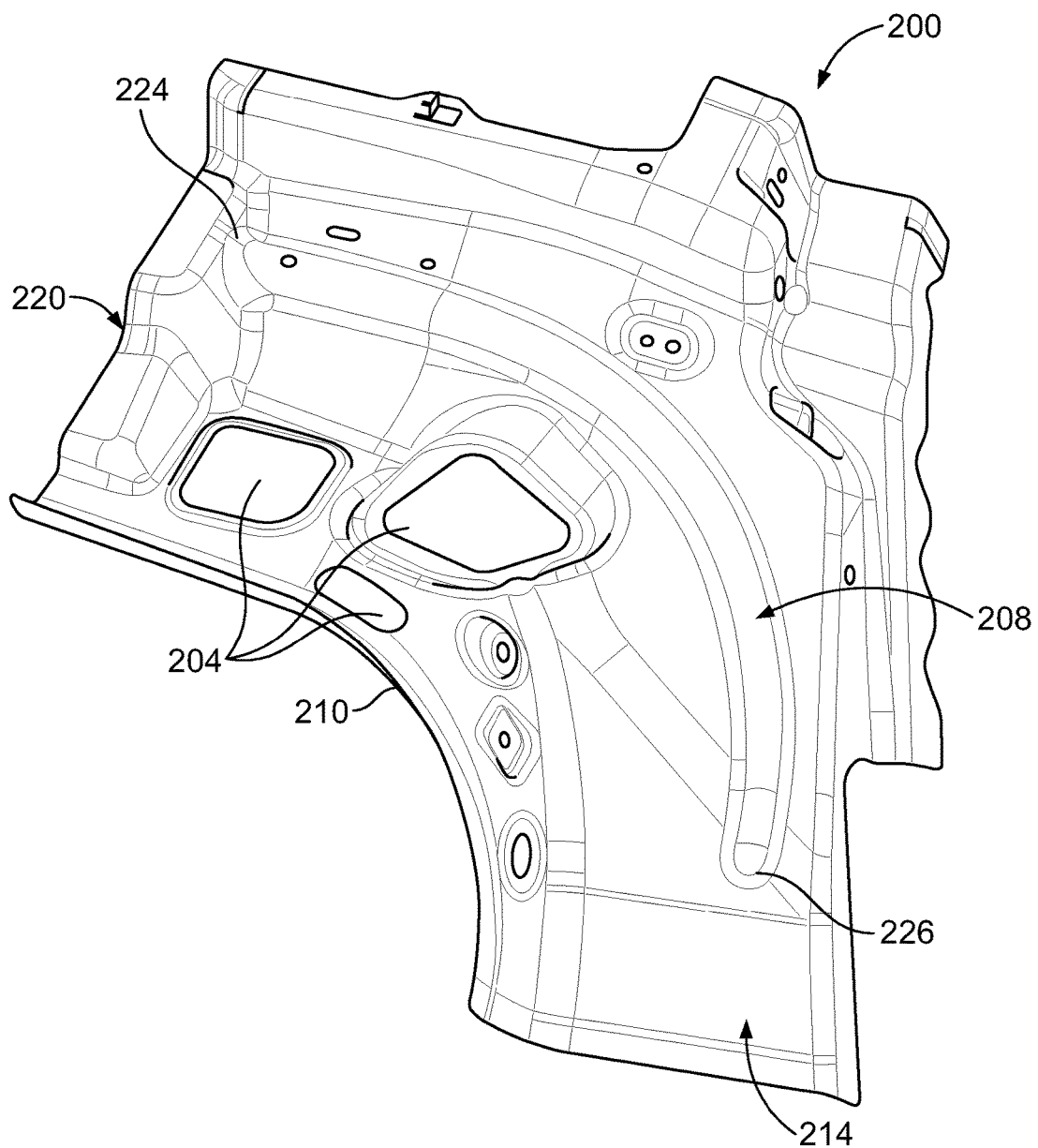
FIG. 4 is a detailed perspective view of another example of an upper inner corner panel region for a vehicle body structure.

For example, FIG. 4 shows another example of a rear upper corner region of a vehicle body structure, referred to generally as a rear upper corner region 200 herein. The rear upper corner region 200 may define access holes 204. The access holes 204 may provide, for example, weld gun access or may provide openings for wires to extend therethrough. A structural reinforcement bead 208 may be located proximate a liftgate opening 210 and the access holes 204 to assist in structurally reinforcing the rear upper corner region 200. The structural reinforcement bead 208 may extend from the from a D-pillar region 214 to a rear header region 220. The structural reinforcement bead 208 may define a substantially arcuate shape having a first end 224 and a second end 226. The structural reinforcement bead 208 may define a substantially tubular shape and define a substantially equal cross-section between the first end 224 and the second end 226. The first end 224 and the second end 226 may be arranged with an arc of the liftgate opening 210 to assist in providing structural reinforcement to the rear upper corner region 200.

Figure 5A:
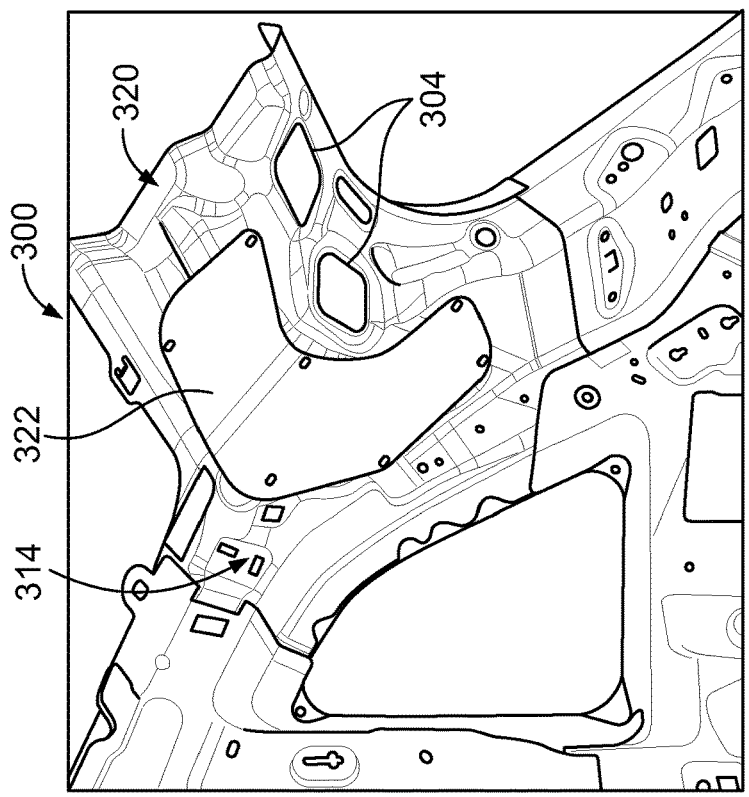
FIG. 5A is a perspective view of an example of an upper corner panel region of a vehicle body showing a partially exploded view of a cover plate.
Figure 5B:
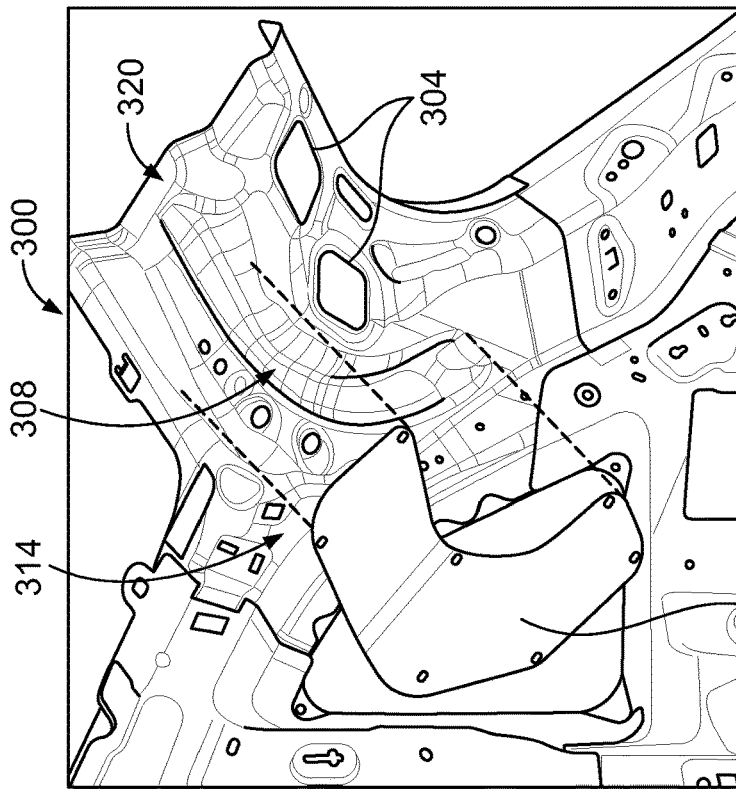
FIG. 5B is a perspective view of the upper corner panel region of FIG. 6A showing the cover plate secured thereto.

FIGS. 5A and 5B show another example of a rear upper corner region of a vehicle body structure, referred to generally as a rear upper corner region 300 herein. The rear upper corner region 300 may define access holes 304. The access holes 304 may provide, for example, weld gun access or may provide openings for wires to extend therethrough. A structural reinforcement bead 308 may extend from a pillar region 314 to a header region 320. A cover plate 322 may be mounted to the rear upper corner region 300 such that the structural reinforcement bead 308 is disposed therebetween. The cover plate 322 may provide additional structural rigidity to the rear upper corner region 300 and may be mounted adjacent the access holes 304 or a door or window opening defined by the vehicle body structure.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:
1. A vehicle body reinforcement assembly comprising:
   a pillar member between a rear quarter window opening and liftgate opening;
   a roof cross member extending along a liftgate opening upper portion; and an upper corner member disposed between the pillar member and the cross member and including a bead formation defining an arc portion substantially congruent to a curved liftgate opening corner and having ends each spaced from one of the pillar member and the cross member.

2. The assembly of claim 1, wherein the upper member defines one or more access holes, wherein the bead formation defines an arc shape having a first end, and wherein the first end is located adjacent one of the one or more access holes.

3. The assembly of claim 2, wherein the bead formation further defines a second end, and wherein the liftgate opening defines an edge having first and second locations at portions of the edge that transition from a curve to substantially straight edges, and wherein a first axis is defined by the first end and first location and a second axis is defined by the second end and second location, and wherein an angle between the first and second axis is between a range of twenty nine degrees and one hundred and fifty one degrees.

4. The assembly of claim 1, wherein the bead formation further defines an inner arc portion, and wherein the upper corner member defines a weld access hole adjacent the inner arc portion.

5. The assembly of claim 1, wherein the bead formation and the upper corner member define a cavity sized to receive a wire bundle.

6. The assembly of claim 1, further comprising a cover plate mounted to the upper corner member such that the bead formation is contained therein.

7. The assembly of claim 1 further comprising a weather strip flange mounted to the upper corner member and defining a first arc, and wherein the bead formation is located adjacent the weather strip flange and defines a second arc substantially congruent to the first arc.

8. An upper body structure for a vehicle comprising:
a pillar portion disposed between one of two door openings and two window openings defined by the upper body structure;
a roof cross member extending along an upper portion of one of the two door openings and the two window openings; and
a rear upper corner member disposed between the pillar portion and the roof cross member and including a bead formation arcuately extending from the pillar portion to the roof cross member and substantially congruent to a curved liftgate opening corner to structurally reinforce the upper body structure at the pillar portion,
wherein the bead formation includes a first end and a second end, and wherein the first end is offset from an edge of the pillar portion and the second end is offset from an edge of the roof cross member.

9. The upper body structure of claim 8, wherein one of the two window openings is a rear quarter window opening.

10. The upper body structure of claim 8 further comprising a rear quarter window opening, wherein the pillar portion and the roof cross member define one or more access holes, and wherein the bead formation defines a first end sized for location between one of the one or more access holes and the rear quarter window opening.

11. The upper body structure of claim 8, wherein the bead formation defines a substantially tubular shape.

12. The upper body structure of claim 8, wherein the bead formation is adjacent a wire bundle, an interior trim panel housing an air bag curtain, and at least one weld access hole.

13. The upper body structure of claim 8, wherein the pillar portion is one of a vehicle A-pillar, a vehicle B-pillar, a vehicle C-pillar, and a vehicle D-pillar.

* * * * *